United States Patent [19]

Yoshida

[11] Patent Number: 5,441,122
[45] Date of Patent: Aug. 15, 1995

[54] HYBRID CAR AND AN OPERATING METHOD THEREFOR

[75] Inventor: Masato Yoshida, Kyoto, Japan

[73] Assignee: Mitsubishi Jidosha Kogyo Kabushiki Kaisha, Tokyo, Japan

[21] Appl. No.: 60,994

[22] Filed: May 14, 1993

[30] Foreign Application Priority Data

May 15, 1992 [JP] Japan .................. 4-123816

[51] Int. Cl.⁶ ............................. B60K 1/00
[52] U.S. Cl. .................. 180/65.2; 180/65.4
[58] Field of Search ........ 180/65.2, 65.3, 65.4, 180/65.8, 69.3; 123/198 R; 165/41

[56] References Cited

U.S. PATENT DOCUMENTS

| | | | |
|---|---|---|---|
| 4,328,669 | 5/1982 | Mort | 123/198 R |
| 4,470,476 | 9/1984 | Hunt | 180/65.2 |
| 5,166,584 | 11/1992 | Fukino et al. | 180/65.8 |
| 5,291,960 | 3/1994 | Brandenberg et al. | 180/65.4 |

FOREIGN PATENT DOCUMENTS

| | | |
|---|---|---|
| 0492152 | 11/1991 | European Pat. Off. . |
| 4109379 | 10/1991 | Germany . |
| 4123843 | 1/1993 | Germany . |
| 9108123 | 6/1991 | WIPO . |

*Primary Examiner*—Richard M. Camby

[57] ABSTRACT

A hybrid car comprises an electric motor for driving the vehicle, an internal combustion engine for power generation, and auxiliary machineries such as an air conditioner. If an air conditioner operating switch is turned on while the hybrid car is running, engine operation is started after the temperature of a catalyst is increased to a predetermined value, and the air conditioner for use as an auxiliary machinery is driven by the engine. The hybrid car is improved in cruising range and power performances as compared with an arrangement in which the auxiliary machineries are driven by means of a battery which is connected to the electric motor.

17 Claims, 6 Drawing Sheets ial machinery, and also an operating method therefore. More particularly the present invention relates to a hybrid car being satisfactory in cruising range and power performances and an operating method for the hybrid car, in which the vehicle can enjoy an extended cruising range and improved power performances.

Recently, the regulations on exhaust gas from those vehicles which use an internal combustion engine as their drive source have been made more rigorous to tackle environmental pollution. In this respect, various new technologies have been developed. Electric cars, which use an electric motor as their drive source and produce no exhaust gas, should be ideal motor vehicles for reduction of the exhaust gas amount. Typical electric cars are designed so that a battery is used to supply the electric motor with electric power. Naturally, however, the available battery capacity for each vehicle is limited, so that the power performances are poorer and the cruising range is shorter than those of the vehicles which use the engine as the drive source. In order to make the electric cars more popular, these technical problems must be solved.

Hybrid cars, which are furnished with a generator, driven by means of an internal combustion engine, for battery charging, are believed to be promising modern electric cars which can enjoy an extended cruising range.

Like the typical electric cars, however, the hybrid cars are arranged so that auxiliary machineries, such as an air conditioner compressor, power-steering oil pump, negative-pressure pump for brake booster, etc., which are mounted in the vehicle, are driven by means of an auxiliary drive motor which is connected to the battery commonly used for the auxiliary drive motor and the vehicle drive motor. Accordingly, the available time for the battery is liable to be shortened so that the battery capacity becomes insufficient as the auxiliaries are driven. It is still difficult, therefore, for some hybrid cars, which are furnished with the motor-driven auxiliaries, to enjoy satisfactory cruising range and power performances. If the vehicle is furnished with the auxiliary drive motor, moreover, the vehicle is increased both in cost and in weight, and requires an additional space for this motor.

OBJECT AND SUMMARY OF THE INVENTION

An object of the present invention is to provide a hybrid car having an electric motor used to drive the vehicle, an internal combustion engine for power generation, and an auxiliary machinery, which is satisfactory in cruising range and power performances.

Another object of the invention is to provide an operating method for a hybrid car, in which the hybrid car can enjoy an extended cruising range and improved power performances.

A hybrid car according to an aspect of the present invention comprises: an electric motor for driving the vehicle; a battery for supplying electric power to the electric motor; a generator for charging the battery; an internal combustion engine operatively isolated from the electric motor and used to drive the generator; and an auxiliary machinery driven by means of the internal combustion engine.

According to another aspect of the invention, there is provided an operating method for a hybrid car of the type described above. This method comprises the steps of: discriminating the operating state of the vehicle by means of first discriminating means; discriminating the charged state of the battery by means of second discriminating means; discriminating the presence or absence of a request for the drive of the auxiliary machinery by means of third discriminating means; and controlling the operating state of the engine by means of a controller in response to at least one result of decisions on the operating state of the vehicle, the charged state of the battery, and the presence or absence of the request for the auxiliary machinery drive.

Preferably, the internal combustion engine operating state controlling step includes a process for adjusting the internal combustion engine to an operating state such that the fuel consumption of the engine is reduced when the auxiliary machinery drive is requested.

Preferably, the internal combustion engine operating state controlling step includes a process for keeping the internal combustion engine in a stopped state when it is concluded that the battery need not be charged, a process for adjusting the engine to a high-speed, high-load state when it is concluded that the battery is insufficiently charged, and a process for driving the engine in a low-speed, low-load state when it is concluded that the auxiliary machinery drive is requested.

Preferably, additional steps are successively executed under the control of the controller when it is concluded that the drive of the internal combustion engine is requested and that the temperature of an exhaust gas purifying catalyst in an exhaust gas purifying device attached to the engine is lower than a predetermined value. The additional steps include bringing the engine to a stopped state, energizing and heating an electrically-heated heater for heating the catalyst, and starting the internal combustion engine by means of an engine starting device when the predetermined value is exceeded by the temperature of the catalyst.

Preferably, the request for the auxiliary machinery drive is delivered each time conditions for the drive of the auxiliary machinery are satisfied in the case where the auxiliary machinery is driven intermittently, or is delivered continuously during the time period immediately after the satisfaction of conditions for the drive of the vehicle and before the satisfaction of conditions for the stoppage of the vehicle.

An advantage of the present invention lies in that the auxiliary machinery operatively connected to the internal combustion engine is driven by means of the engine, in the hybrid car which comprises the electric motor for driving the vehicle, the engine for power generation, and the auxiliary machinery. In this arrangement, the energy efficiency for the auxiliary machinery drive can be made higher, and the available time for the battery can be made longer than in the case where the auxiliary machinery is driven by using the battery in the vehicle, e.g., the battery which is connected to the electric motor for the vehicle drive. Thus, the hybrid car can enjoy an extended cruising range and improved power performances. Also, those conventional auxiliary machineries which are adapted to be mounted in the engine-driven vehicles can be utilized without any modification of specifications. Because it is unnecessary to use a drive motor for the auxiliary machinery and a battery therefor, moreover, costs, weights, spaces, etc., associated with these elements can be reduced. Further, the operation of the internal combustion engine for the drive of the auxiliary machinery can be performed, for example, in an engine operation region such that the engine load and engine speed take their respective minimum necessary values, so that the auxiliary machinery can be driven as required with use of less fuel.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION FOR THE PREFERRED EMBODIMENTS OF THE PRESENT INVENTION

An embodiment of the present invention will now be described with reference to the accompanying drawings.

Figure 1:
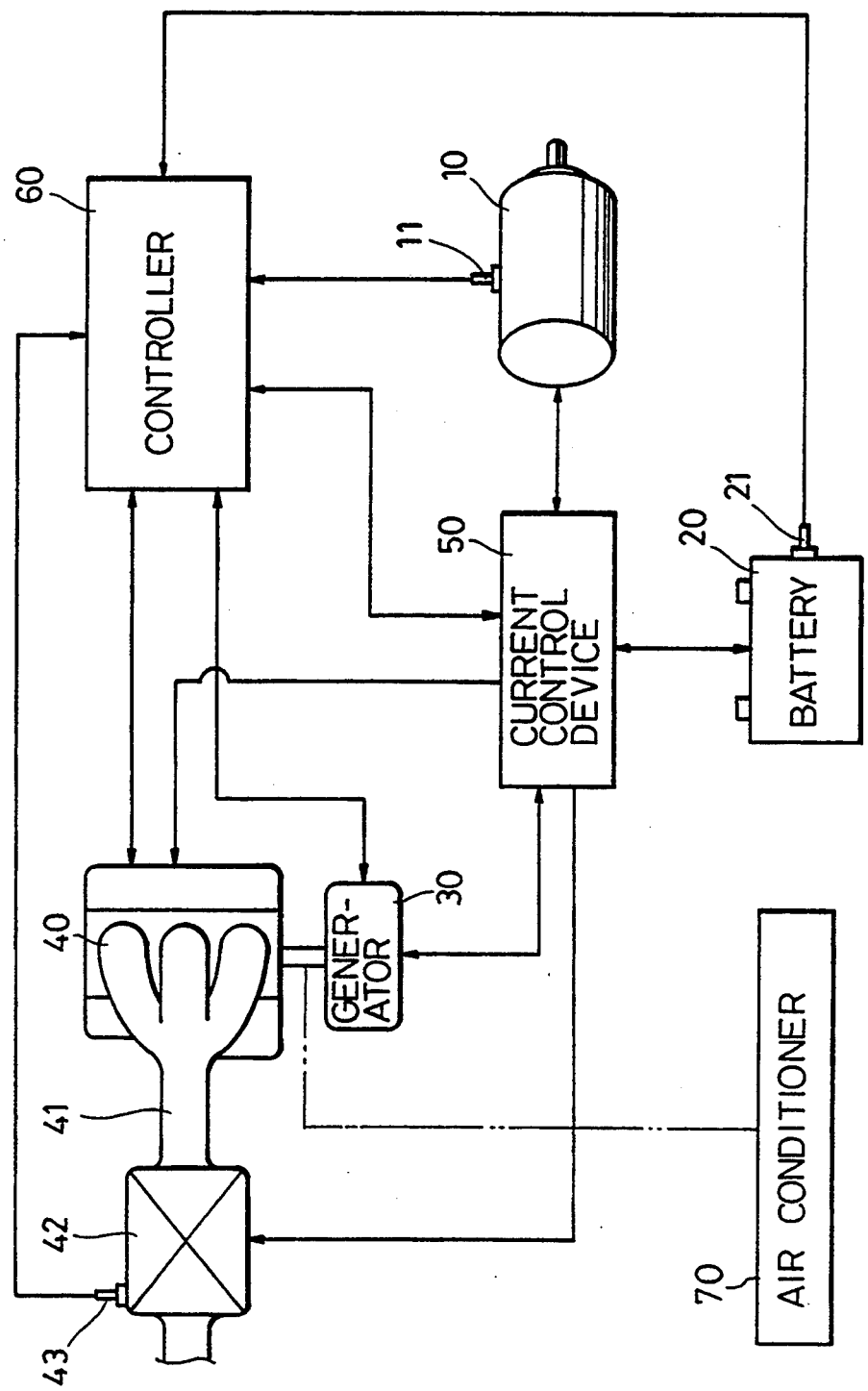
FIG. 1 is a schematic view showing the principal part of a hybrid car to which is applied an operating method for an internal combustion engine for power generation according to an embodiment of the present invention.

Referring to FIG. 1, a hybrid car (vehicle) is provided with a certain number of electric motors (one of which is denoted by numeral 10) depending on its specifications. The electric motor 10, which is used as a drive source for the vehicle, is formed of a DC or AC motor, and its output shaft is operatively connected to driving wheels (not shown) of the vehicle through a power transmission mechanism (not shown) of the vehicle. The electric motor 10 is connected electrically to a battery 20 through a current control device 50 which operates under the control of a controller 60. While the vehicle is running, the electric motor 10 normally drives the vehicle as power is supplied from the battery 20. When the vehicle is in a decelerating operation, the electric motor 10 functions as an electric generator to generate deceleration recovery power, with which the battery 20 is charged. Further, the electric motor 10 is fitted with a motor temperature sensor 11 for detecting the temperature of the electric motor 10. Also, the battery 20 is fitted with a battery capacity sensor 21 for detecting a parameter indicative of the battery capacity, e.g., battery voltage value.

The hybrid car is further provided with an electric generator 30 for generating electric power for battery charging, and an internal combustion engine 40 having an output shaft operatively connected to the generator shaft and serving to drive the electric generator 30. The electric generator 30, which is formed of a DC or AC generator, is connected electrically to the battery 20 through the current control device 50. Thus, the battery 20 is charged with electric power generated by the electric generator 30 during the operation of the internal combustion engine 40. Further, the electric generator 30 is furnished with a control section (not shown), used to adjust the quantity of generated power and stop power generation, and various sensors (not shown) for detecting generator operation information, including the temperature, failed state, etc. of the electric generator. At the start of the engine operation, the electric generator 30 functions as a so-called starter which starts the internal combustion engine 40 when supplied with electric power from the battery 20. Alternatively, an engine starter may be provided separately from the electric generator 30. In this case, the generator 30 is used for power generation only.

The internal combustion engine 40 for power generation includes an engine body, formed of, e.g., a small lightweight piston engine, and an engine drive system (not shown). The engine drive system includes a fuel supply system having a throttle valve, an ignition system, a fuel injection system, and various actuators connected electrically to the current control device 50, and is used for start and stop of the internal combustion engine 40, engine speed control, and throttle valve opening control. An exhaust gas purifier 42 is attached to an exhaust pipe 41 which is connected to an exhaust port (not shown) of the internal combustion engine 40 and is used to discharge exhaust gas. The exhaust gas purifier 42 is composed of a catalyst for removing pollutant or noxious gases, such as CO, $NO_x$, etc. from the exhaust gas passing through the exhaust pipe 41, and an electrically-heated catalyst heater which is connected to the battery 20 through the current control device 50. When the catalyst is heated to be activated by means of the electrically-heated catalyst heater, the catalyst can produce a very strong exhaust gas purifying effect. The exhaust gas purifier 42 is fitted with a catalyst temperature sensor 43 for detecting the catalyst temperature. Further, the internal combustion engine 40 is provided with various sensors (not shown) for detecting engine operation information, including the engine speed, air intake, throttle valve opening, etc.

The current control device 50, which is located among the electric motor 10, battery 20, electric generator 30, internal combustion engine 40, and the electrically-heated catalyst heater of the exhaust gas purifier 42, as described above, serves to switch the electrical connections between each corresponding one of the aforesaid elements under the control of the controller 60, and to adjust the current value for the power supply between the corresponding elements. The current control device 50 includes, for example, an input section (not shown) for inputting current control device control signals from the controller 60, an adjustment section (not shown) which operates in response to a control output for electrical connection switching and current value adjustment delivered from the input section, and a power converter section (not shown) which operates in response to a control output from the adjustment section. The current control device 50 is provided with various sensors (not shown) for detecting the temperature, failed state, etc. of the current control device 50.

The controller 60 receives various kinds of operation information from the various components of the hybrid car and the sensors, and controls the operations of the electric motor 10, internal combustion engine 40, and current control device 50. The controller 60 includes, for example, a processor (not shown) for executing control programs, which will be mentioned later, memories (not shown) for storing the control programs, various data, etc., and interface circuits (not shown) for signal transfer between the controller 60 and the aforesaid various components and sensors.

Specifically, the controller 60 is connected electrically to the motor temperature sensor 11 attached to the electric motor 10, the battery capacity sensor 21 attached to the battery 20, the catalyst temperature sensor 43 attached to the exhaust gas purifier 42, and the various sensors attached individually to the electric generator 30, internal combustion engine 40, and current control device 50. Also, the controller 60 is connected electrically to various sensors (not shown) which are arranged in the hybrid car and used to detect vehicle operation information, such as the vehicle velocity, depth of accelerator pedal depression, etc. The controller 60 receives from these sensors a motor temperature signal, battery capacity signal, catalyst temperature signal, generator operation information (e.g., temperature and failed state of the electric generator 30), internal combustion engine operation information (e.g., rotation speed, air intake, and throttle valve opening of the internal combustion engine 40), current control device operation information (e.g., failed state of the current control device 50), and vehicle operation information. Based on the various signals and information thus received, the controller 60 sets generator control signals associated with the control of the electric generator 30 for the quantity of generated power, suspension of the power generation, etc., internal combustion engine control signals associated with the control of the internal combustion engine 40 for its starting, stopping, speed, etc., and the current control device control signals associated with the control of the current value, current supply direction, etc. for the power supply between the aforesaid components which are connected to the current control device 50. The controller 60 delivers these set control signals to the electric generator 30, internal combustion engine 40, and current control device 50.

Further, an air conditioner 70, as an example of an auxiliary machinery, is mounted in the hybrid car. The air conditioner 70 includes a compressor (not shown) and an air conditioner operating switch, and is arranged to be driven by means of the internal combustion engine 40. The compressor has a rotary shaft which is operatively connected to the output shaft of the internal combustion engine 40 in a manner such that the two shafts can be separated by means of an electromagnetic clutch (not shown) or other suitable means. The switch can be manually operated by an operator. Also, the hybrid car can be furnished with some other auxiliary machineries, such as a power-steering oil pump, negative-pressure pump for brake booster, etc.

Figure 7:
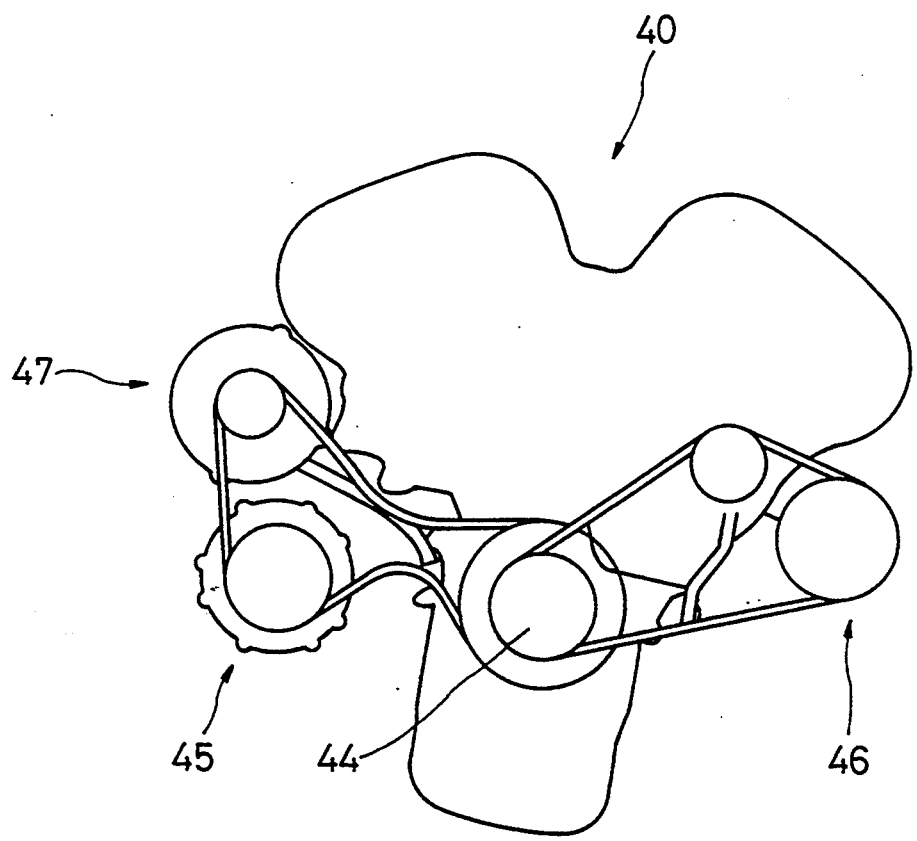
FIG. 7 is a schematic side view showing an engine corresponding to the engine of FIG. 1 and furnished with an air conditioner pump, power-steering pump, and brake booster pump.

As shown in FIG. 7, an air conditioner pump 45 and a brake booster pump 47 are mounted on the front side of the internal combustion engine 40, and a power-steering pump 46 is mounted on the rear side of the internal combustion engine 40. These individual pumps 45 to 47 are driven by the internal combustion engine 40 with the aid of belts which are passed around and between a crankshaft pulley 44 of the engine and pulleys on the pumps.

Referring now to FIGS. 2 to 6, operation control of the electric motor 10, internal combustion engine 40, and exhaust gas purifier 42 by means of the controller 60 will be described.

Figure 2:
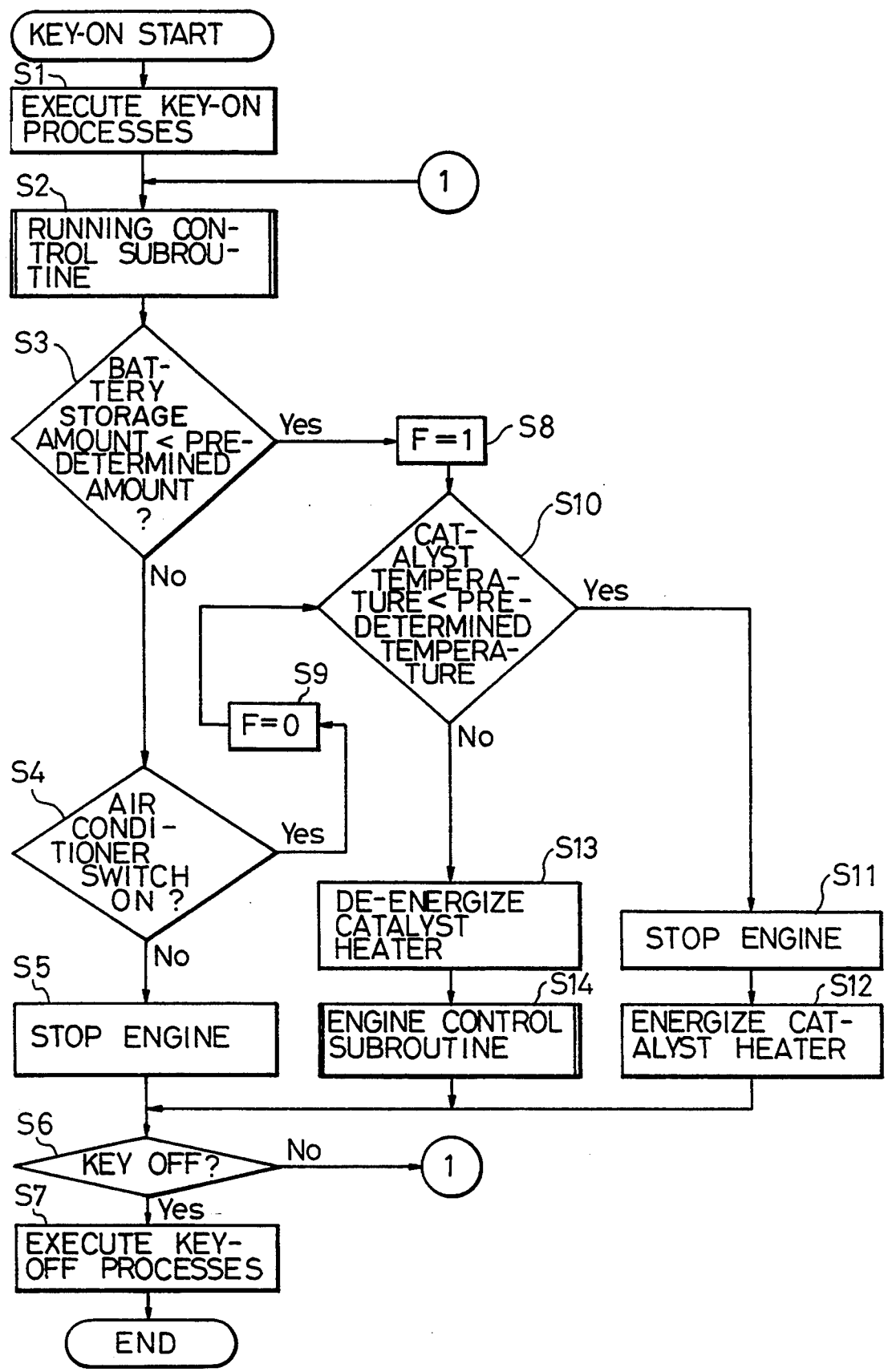
FIG. 2 is a flow chart illustrating a main routine for operation control of an electric motor for vehicle drive, internal combustion engine for power generation, and catalyst heater executed by means of a controller shown in FIG. 1.

When a driver turns on a starter key to actuate the vehicle, the processor of the controller 60 discriminates the key-on operation, and starts executing a main routine shown in FIG. 2. More specifically, the processor first executes key-on processes, including reading control data, backed up at the end of the preceding vehicle running cycle, from the memories, checking the operating conditions of the various components of the hybrid car, etc. (Step S1), and then executes a running control subroutine shown in detail in FIG. 3 (Step S2).

Figure 3:
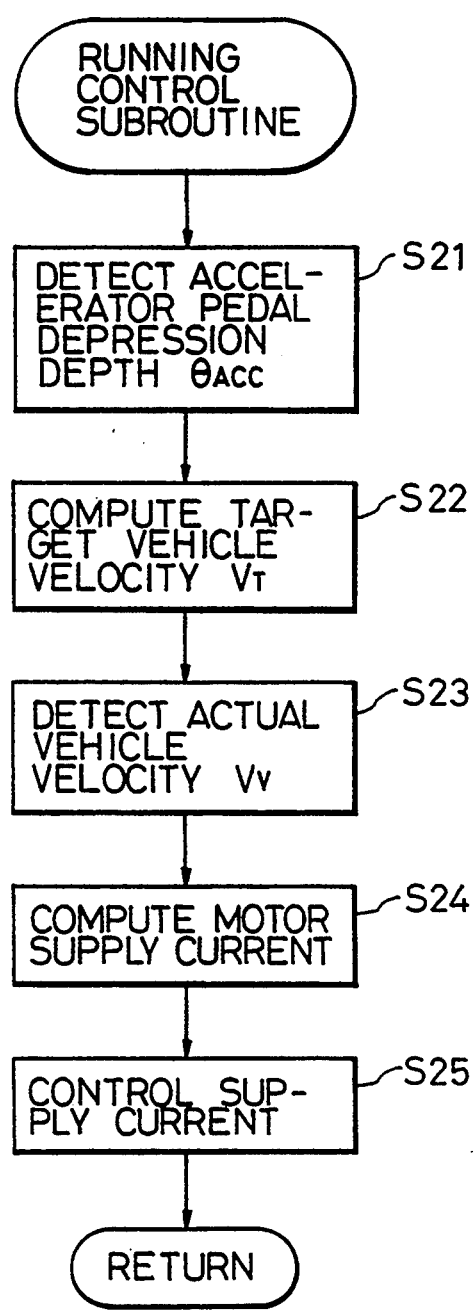
FIG. 3 is a flow chart illustrating the detail of a running control subroutine shown in FIG. 2.

In the running control subroutine shown in FIG. 3, the processor first detects an accelerator pedal depression depth $\theta_{Acc}$ by reading the output of an accelerator pedal depression depth sensor (Step S21), and then obtains a target vehicle velocity $V_T$, compatible with the depression depth $\theta_{Acc}$ detected in Step S21, in accordance with operational expressions or lookup tables for setting the target vehicle velocity (Step S22). The expressions or tables, which correspond to a characteristic curve (FIG. 5) indicative of the relationships between the accelerator pedal depression depth $\theta_{Acc}$ and the target vehicle velocity $V_T$, are previously described in the control programs or stored in the memories of the controller 60.

Figure 5:
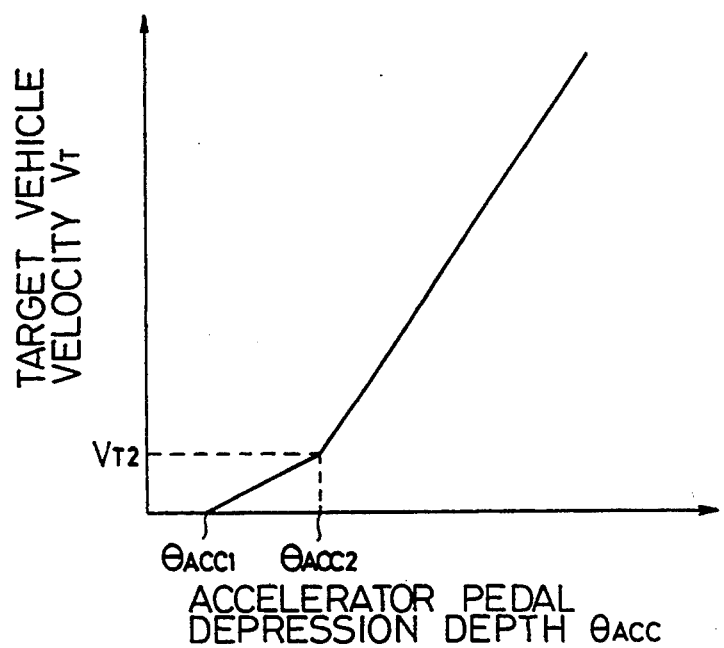
FIG. 5 shows a characteristic curve illustrating the relationships between the accelerator pedal depression depth ($\theta_{Acc}$) and target vehicle velocity ($V_T$) used in the running control subroutine.

As shown in FIG. 5, the target vehicle velocity $V_T$ is set at zero to prevent the vehicle from starting to run in a first depression depth region where the accelerator pedal depression depth $\theta_{Acc}$ takes a small value ranging from zero to $\theta_{Acc1}$, and then the target vehicle velocity $V_T$ increases from zero to $V_{T2}$ to allow the vehicle slowly to start running as the depression depth $\theta_{Acc}$ increases in a second depression depth region where the depression depth $\theta_{Acc}$ takes a relatively small value ranging from $\theta_{Acc1}$ to $\theta_{Acc2}$. In a third depression depth region where the depression depth $\theta_{Acc}$ exceeds $\theta_{Acc2}$, moreover, the target vehicle velocity $V_T$ increases from $V_{T2}$, at a rate higher than the increasing rate for the second region, to allow normal vehicle running as the depression depth $\theta_{Acc}$ increases.

Referring again to FIG. 3, the processor of the controller 60 reads the output of a vehicle velocity sensor to detect an actual vehicle velocity $V_v$ (Step S23) after setting the target vehicle velocity $V_T$, and then computes a motor current supply (required motor driving current amount) I (Step S24). In computing the motor current supply I, the processor first calculates a vehicle velocity difference ($=V_v-V_T$) on the basis of the actual vehicle velocity $V_v$ detected in Step S23 and the target vehicle velocity $V_T$ set in Step S22, and then sets a required vehicle body acceleration a, which is compatible with the previously detected actual vehicle velocity $V_v$ and the previously calculated vehicle velocity difference ($=V_v-V_T$), in accordance with operational expressions or lookup tables for setting the required vehicle body acceleration, which correspond to characteristic curves (FIG. 6) indicative of the relationships between the actual vehicle velocity, the vehicle velocity difference and the required vehicle body acceleration.

Figure 6:
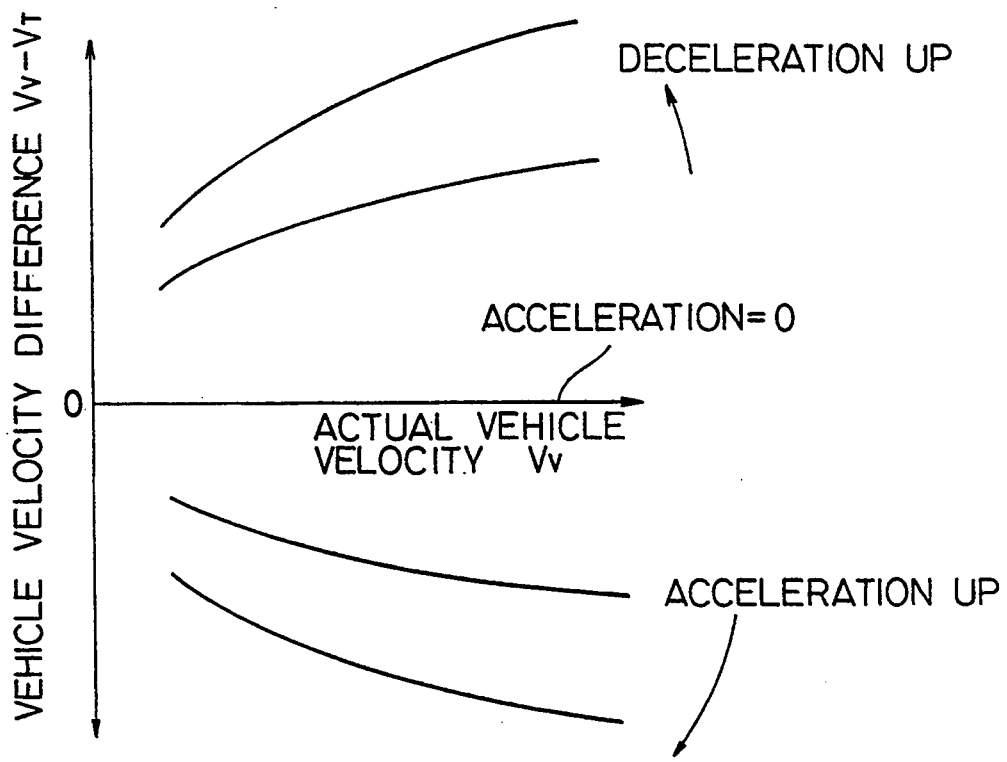
FIG. 6 shows characteristic curves illustrating the relationships between the actual vehicle velocity ($V_v$), vehicle velocity difference ($V_v - V_T$), and vehicle body acceleration ($\alpha$) used in the running control subroutine.

As shown in FIG. 6, the required vehicle body acceleration α takes a negative value, which is indicative of a the necessity of decelerating operation of the vehicle, if the actual vehicle velocity $V_v$ is higher than the target vehicle velocity $V_T$, and therefore, the vehicle velocity difference is positive. If the vehicle velocity difference is negative, on the other hand, the acceleration α takes a positive value which is indicative of the necessity of an accelerating operation. The absolute value of the acceleration α increases in proportion to the actual vehicle velocity even though the absolute value of the vehicle velocity difference is fixed.

After setting the required vehicle body acceleration α in this manner, the processor computes a required motor output $P_s$ in accordance with an operational expression, $P_s = [\{C \cdot A \cdot (V_v)^2 + \mu \cdot W + \alpha \cdot W/g\} \cdot V_v]/(K1 \cdot \eta)$, where C, A, $V_v$, μ, W, α and η are the air resistance, front projected area, actual velocity, rolling coefficient of resistance, overall weight, required body acceleration, and power transmissibility, respectively, of the vehicle. Further, g and K1 are the acceleration of gravity and unit conversion factor, respectively, and the factor K1 is adjusted to, e.g., 270. The above operational expression is adapted for the case where the road has no gradient. Instead of making the computation according to this expression, in setting the required motor output, a lookup table for setting the motor output may be used for reference.

Then, the processor computes the required driving current value (motor current supply) I in accordance with an operational expression, $I = (K2 \cdot P_s)/(\eta_{MTR} \cdot V)$, where K2, $P_s$, $\eta_{MTR}$ and V are a unit conversion factor, required motor output, motor efficiency of the electric motor 10, and motor operating voltage of the electric motor 10, respectively, and the factor K2 is adjusted to, e.g., 735.

In Step S25, the processor delivers a control signal indicative of the required motor driving current value I to the current control device 50. In response to this current control signal, the control device 50 performs, for example, duty control such that a motor driving current of the value I is supplied from the battery 20 to the electric motor 10 through the current control device 50. As a result, the actual vehicle velocity $V_v$ increases or decreases to or is kept at the value of the target vehicle velocity $V_T$. If the accelerator pedal depression depth is greater than the value $\theta_{Acc1}$ immediately after the starter key is turned on, therefore, the electric motor 10 is actuated to allow the vehicle to start running.

Referring again to FIG. 2, the processor of the controller 60 reads the battery capacity signal from the battery capacity sensor 21 after the running control subroutine (Step S2) is finished, and determines, in accordance with the read signal, whether or not the storage amount of the battery 20 is smaller than a predetermined necessary amount for the electric motor 10 to cause the vehicle to run satisfactorily (Step S3). If the result of decision in this step is NO, that is, if the battery storage amount is not smaller than the predetermined storage amount so that the battery 20 does not need to be charged, the processor further determines whether the switch of the air conditioner 70 is on or not (Step S4). If it is concluded in Step S4 that the air conditioner switch is not on, and therefore, engine operation for the drive of the air conditioner 70 is unnecessary, the processor delivers an internal combustion engine control signal for an instruction to stop the internal combustion engine 40 to the engine drive system (Step S5). As a result, the internal combustion engine 40 is kept in a stopped state when its operation is suspended, and the engine operation is stopped when the engine is operating. Thus, exhaust gas can be prevented from being produced by useless engine operation.

In Step S6, the processor determines whether the starter key is turned off or not. If the result of the decision in this step is NO, the processor returns to the aforesaid running control subroutine (Step S2). If it is concluded that the starter key is turned off, on the other hand, the processor executes key-off processes, including writing control data in a backup memory, checking the operating conditions of the various components of the hybrid car, etc. (Step S7), whereupon the main routine is finished.

The battery storage amount may become smaller than the predetermined amount while the aforementioned series of processes of Steps S2 to S6 is repeated without turning off the starter key so that the required driving current is supplied to the electric motor 10 as the vehicle runs. In this case, the battery 20 must be charged. If it is concluded in Step S3 that the battery charging is necessary, the processor sets an engine control flag F at "1" which is indicative of an insufficient battery storage amount (Step S8). If it is concluded that the air conditioner operating switch has been turned on during the vehicle drive, moreover, the processor resets the flag F at "0" which indicates that the battery storage amount is proper and the air conditioner operating switch has been turned on (Step S9).

In Step S10 which follows Step S8 or S9, the processor reads the catalyst temperature signal from the catalyst temperature sensor 43, and determines, in accordance with the read signal, whether or not the catalyst temperature is lower than a predetermined necessary temperature for satisfactory activation of the catalyst. If the result of the decision in this step is YES, and therefore, exhaust gas containing pollutant or noxious gases may possibly be discharged from the internal combustion engine 40 when the engine is operated, the processor delivers the engine control signal for the instruction to stop the engine to the engine drive system (Step S11), thereby maintaining the stopped state of the internal combustion engine 40 or stopping the engine operation when the engine is operating. Thus, if the catalyst temperature lowers from any cause during the engine operation, the engine operation is stopped.

In Step S12, the processor delivers a control signal for an instruction for current supply to the electrically-heated catalyst heater of the exhaust gas purifier 42 to the current control device 50. In response to this control signal, the current control device 50 operates so that a heating current is supplied from the battery 20 to the electrically-heated catalyst heater. Accordingly, the electrically-heated catalyst heater is energized to heat the catalyst. After the instruction for the current supply to the electrically-heated catalyst heater is given, the processor determines again whether the starter key is turned off or not (Step S6). If the key is not turned off, the processor returns to Step S2, and then repeatedly executes the aforesaid series of processes of Steps S2, S3, S8, S10, S11, S12 and S6 or the processes of Steps S2, S3, S4, S9, S10, S11, S12 and S6.

If it is concluded in Step S10, thereafter, that the catalyst temperature reaches a predetermined temperature, and therefore, the exhaust gas purifier 42 is in an operating state such that the pollutant or noxious gases can be removed from the exhaust gas by the exhaust gas purifying effect of the catalyst, the processor delivers a control signal for an instruction to stop the current supply to the electrically-heated catalyst heater to the current control device 50 (Step S13). As a result, the current supply to the electrically-heated catalyst heater is stopped. Then, the processor executes an engine control subroutine shown in detail in FIG. 4 (Step S14).

Figure 4:
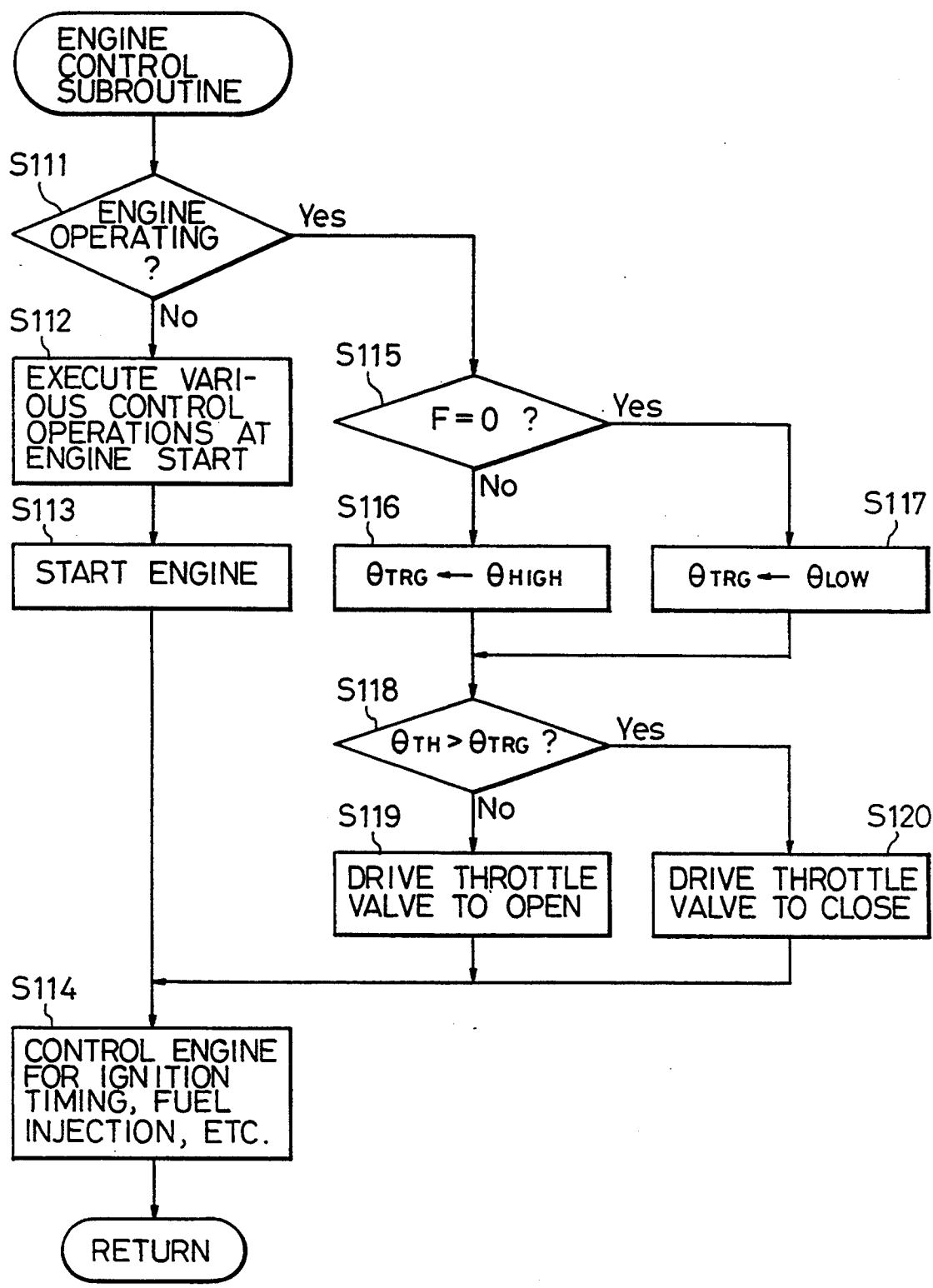
FIG. 4 is a flow chart illustrating the detail of an engine control subroutine shown in FIG. 2.

In the engine control subroutine shown in FIG. 4, the processor determines whether the internal combustion engine 40 is operating or not, with reference to the contents of the memories of the controller 60 which indicate whether an engine control signal for an instruction to operate the engine is delivered or not (Step S111). If the result of decision in this step is NO, the processor performs various control operations at the start of the engine operation (Step S112). For example, the processor delivers a current control device control signal for an instruction to start a fuel pump (not shown) to the current control device 50. Also, the processor delivers an engine control signal for an instruction to drive the throttle valve for a required angle in a required direction to a throttle valve drive mechanism of the engine drive system, including, e.g., a pulse motor. The required angle and direction are discriminated by a present throttle valve opening, detected through the output of a throttle valve opening sensor, and a predetermined throttle valve opening for the engine start. As a result, the current control device 50 operates so that a required driving current is supplied from the battery 20 to a fuel pump drive motor (not shown) through the current control device 50, thereby starting the fuel pump, and the throttle valve is positioned in a predetermined angular position for the engine start.

Then, the processor delivers a current control device control signal for an instruction to start the engine to the current control device 50 (Step S113). As a result, the current control device 50 operates so that a required driving current is supplied from the battery 20 to the starter (generator 30) through the device 50. Accordingly, the internal combustion engine 40 is started by means of the electric generator 30 which serves as the starter. If the engine control flag F is at "1" which is indicative of an insufficient battery storage amount, therefore, the electric generator 30 is driven by the internal combustion engine 40 to start the power generation. If the flag F is at "0" which is indicative of a request for the operation of the air conditioner 70, on the other hand, the internal combustion engine 40 starts the operation of the air conditioner 70.

If the battery storage amount is insufficient (F = 1), a generator control signal indicative of the quantity of generated power is supplied from the processor to the generator control section, and a current control device control signal for an instruction to charge the battery 20 with the generated electric power is supplied from the processor to the current control device 50, whereby the battery 20 is charged with the power generated from the electric generator 30. On the other hand, the processor de-energizes the electromagnetic clutch between the rotary shaft of the compressor of the air conditioner 70 and the output shaft of the internal combustion engine 40 to disconnect the air conditioner 70 from the internal combustion engine, thereby preventing the air conditioner 70 from operating. If the request for the operation of the air conditioner 70 is made (F=0), in contrast with this, the processor energizes the electromagnetic clutch to establish the connection between the air conditioner 70 and the internal combustion engine 40, thereby allowing the air condition 70 to operate. On the other hand, the processor supplies the control section of the electric generator 30 with a generator control signal for an instruction to stop the power generation, thereby stopping the power generation.

After the engine is started, the processor executes conventional engine control, including ignition timing control, fuel injection control, etc. (Step S114), whereupon the engine control subroutine is finished. Then, in Step S6 of the main routine (FIG. 2), it is determined again whether the starter key is turned off or not. If the result of decision in this step is YES, the key-off processes are executed in Step S7, whereupon the execution of the main routine is finished. If it is concluded in Step S6 that the starter key is not off, the process of Step S2 (running control subroutine) and the subsequent processes are executed again in the aforesaid manner. Since the internal combustion engine 40 is already started in the previous engine control subroutine, it is concluded in Step S111 of the engine control subroutine (Step S14), executed again following the series of processes of Steps S2, S3, S8, S10 and S13 or the processes of Steps S2, S3, S4, S9, S10 and S13.

In this case, the processor of the controller 60 determines whether or not the aforesaid engine control flag F is at "0" which indicates that the battery storage amount is proper and the air conditioner operating switch is on (Step S115). If the result of decision in this step is NO, that is, if the control flag F is at "1" which is indicative of an insufficient battery storage amount, the processor adjusts a target throttle valve opening $\theta_{TRG}$ to a first predetermined opening $\theta_{HIGH}$ for required power generation, which is previously set at a large value (Step S116). If the result of decision in Step S115 is YES, that is, if the flag F is at "0" which indicates that the battery storage amount is proper and the air conditioner operating switch is on, on the other hand, the processor adjusts the target throttle valve opening $\theta_{TRG}$ to a second predetermined opening $\theta_{LOW}$ for the drive of the air conditioner 70, which is previously set at a small value (Step S117).

Further, the processor detects the present throttle valve opening $\theta_{TH}$ by the throttle valve opening sensor output, and determines whether or not the detected present opening $\theta_{TH}$ is greater than the target throttle valve opening $\theta_{TRG}$ set in Step S116 or S117 (Step S118). If the result of decision in this step is NO, the processor delivers an engine control signal for an instruction to drive the throttle valve in the opening direction to the engine drive system (Step S119). If it is concluded in Step S118 that the present throttle valve opening $\theta_{TH}$ is greater than the target throttle valve opening $\theta_{TRG}$, on the other hand, the processor delivers an engine control signal for an instruction to drive the throttle valve in the closing direction to the engine drive system (Step S120). As a result, the throttle valve of the internal combustion engine 40 is opened or closed in accordance with the result of decision in Step S118, by means of the throttle valve drive mechanism. The aforementioned conventional engine control is executed in Step S114 which directly follows Step S119 associated with the opening-direction drive of the throttle valve or Step S120 associated with the closing-direction drive of the throttle valve.

Thus, if a request for battery charging is made, the internal combustion engine 40 is operated in an engine operation region which corresponds to the throttle valve opening $\theta_{HIGH}$. If the request for the air conditioner 70 operation is made, on the other hand, the engine is operated in an engine operation region which corresponds to the throttle valve opening $\theta_{Low}$ and in which the engine load and engine speed take their respective minimum necessary values.

When the main routine is restored after the engine control subroutine is finished, the program proceeds to Step S7 (key-off processes) or Step S2 (running control subroutine) in response to the result of the decision on the starter key operation in Step S6 of the main routine, as described before.

The following is a summary of the above-described operation control of the various components of the hybrid car by means of the controller 60. When the starter key is turned on, computation of the current supply to the electric motor 10 and control of the motor current supply are started, and this motor control is carried out periodically, thereafter. As a result, the hybrid car, which uses the electric motor 10 as its drive source, runs. If the storage amount of the battery 20 is sufficient, and if an auxiliary machinery, e.g., the air conditioner 70, need not be driven, while the vehicle is running, the operation of the internal combustion engine 40 for driving the electric generator 30 or the air conditioner 70 is stopped, so that useless discharge of exhaust gas can be prevented. If there is a possibility of the battery storage amount becoming insufficient, or if the air conditioner 70 is expected to be driven, the internal combustion engine 40 is started to cause the electric generator 30 to generate electric power, so that the battery 20 is charged with the generated power, or the air conditioner 70 is driven by means of the internal combustion engine 70. If the catalyst temperature measured before starting the engine operation is lower than the necessary temperature for the activation of the catalyst, the electrically-heated catalyst heater is energized to heat the catalyst. Since such battery charging is carried out every time the vehicle runs, the power supply from the battery 20 alone can normally enable the vehicle to run before heating the catalyst is completed after the start of the vehicle running. When the catalyst heating is finished, the battery can be charged as required. Normally, therefore, the hybrid car never finds it difficult to run in the course of its running.

During the engine operation, the target throttle valve opening $\theta_{TRG}$ is set at a large value if the battery charging is necessary, or at a small value if the drive of the air conditioner 70 only is needed, whereby the throttle valve is opened or closed. As a result, the engine is operated in an engine operating state, depending on the presence/absence of the necessity of the battery charging and the drive of the air conditioner 70 or other auxiliary machineries. The engine operation for the auxiliary machinery drive is performed in the engine operation region which corresponds to the throttle valve opening $\theta_{Low}$ and in which the engine load and engine speed take their respective minimum necessary values, so that the fuel consumption can be restrained. Since the auxiliary machineries are driven by means of the engine, the auxiliary machinery drive never causes a shortage of the battery storage amount. Thus, the vehicle, which uses the electric motor as its drive source, can enjoy improved power performances and an extended cruising range. In the case that the auxiliary machineries are driven directly by means of the engine, the energy efficiency for the drive can be made higher than in the case where the auxiliary machineries are driven by means of the motor which is driven by the battery charged through the engine operation.

When the starter key is turned off, thereafter, the aforesaid motor control is finished, and the electric motor 10 ceases to run the vehicle. If the starter key is turned off during the engine operation, the aforesaid engine control is finished when the key is turned off, so that the power generation through the engine drive is stopped.

The present invention is not limited to the embodiment described above, and various changes and modifications may be effected therein.

Although the drive of only the air conditioner 70 for use as an auxiliary machinery has been described in connection with the illustrative embodiment, the present invention may be also applied to the drive of the power-steering oil pump 46 and the brake booster pump 47 shown in FIG. 7, and other auxiliary machineries. If necessary, in this case, the internal combustion engine 40 may be operated continually, in contrast with the case of the above-described embodiment in which the internal combustion engine 40 is operated only during the operation of the air conditioner 70 and the battery charging.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hybrid car comprising:
   an electric motor for driving the hybrid car;
   a battery for supplying electric power to said electric motor;
   a generator for charging said battery;
   an internal combustion engine operatively isolated from said electric motor and used to drive said generator;
   an auxiliary machinery driven by means of said internal combustion engine;
   first discriminating means for discriminating an operating state of the hybrid car;
   second discriminating means for discriminating a charged state of said battery;
   third discriminating means for discriminating presence or absence of a request for the drive of said auxiliary machinery; and
   a controller for controlling an operating state of said internal combustion engine in response to at least one result from decisions on said operating state of the hybrid car by said first discriminating means, said charged state of said battery by said second discriminating means, and the presence or absence of said request for the drive of said auxiliary machinery by said third discriminating means.

2. An operating method for a hybrid car which has an electric motor for driving the hybrid car, a battery for supplying electric power to the electric motor, a generator for charging the battery, an internal combustion engine operatively isolated from the electric motor and used to drive the generator, and an auxiliary machinery driven by means of the internal combustion engine, the method comprising steps of:

(a) discriminating an operating state of the hybrid car;
(b) discriminating a charged state of the battery;
(c) discriminating presence or absence of a request for the drive of the auxiliary machinery; and
(d) controlling an operating state of the internal combustion engine by means of a controller in response to at least one result from decisions on said operating state of the hybrid car discriminated at said step (a), said charged state of the battery discriminated at said step (b), and the presence or absence of the request for the auxiliary machinery drive discriminated at said step (c).

3. An operating method for a hybrid car according to claim 2, wherein said step (d) includes the step of adjusting the internal combustion engine to an operating state such that the fuel consumption of the internal combustion engine is reduced when the auxiliary machinery drive is discriminated to be requested at said step (c).

4. An operating method for a hybrid car according to claim 2, wherein said step (d) includes the steps of
(d) (1) keeping the internal combustion engine in a stopped state when said operating state of the battery is discriminated as not needing to be charged,
(d) (2) adjusting the internal combustion engine to a high-speed, high-load state when said operating state of the battery is discriminated as being insufficiently charged, and
(d) (3) driving the internal combustion engine in a low-speed, low-load state when the auxiliary machinery drive is discriminated as being requested.

5. An operating method for a hybrid car according to claim 4, wherein additional steps are successively executed under the control of the controller when the drive of the internal combustion engine is discriminated as being requested and the temperature of an exhaust gas purifying catalyst in an exhaust gas purifying device attached to the internal combustion engine is lower than a predetermined value, the additional steps include,
bringing the internal combustion engine to a stopped state,
energizing and heating an electrically-heated heater for heating said exhaust gas purifying catalyst, and
starting the internal combustion engine by means of an engine starting device when the predetermined value is exceeded by the temperature of the exhaust gas purifying catalyst.

6. An operating method for a hybrid car according to claim 4, wherein the request for the auxiliary machinery drive is delivered each time conditions for the drive of the auxiliary machinery are satisfied in a case where the auxiliary machinery is driven intermittently.

7. An operating method for a hybrid car according to claim 4, wherein the request for the auxiliary machinery drive is delivered continuously during a time period immediately after the satisfaction of conditions for the drive of the hybrid car and before the satisfaction of conditions for the stoppage of the hybrid car.

8. A hybrid car comprising:
an electric motor for driving the hybrid car;
a battery for supplying electric power to said electric motor;
a generator for charging said battery;
an internal combustion engine operatively isolated from said electric motor and used to drive said generator;
an auxiliary machinery driven by means of said internal combustion engine;
first discriminating means for discriminating an operating state of the hybrid car;
second discriminating means for discriminating a charged state of said battery;
third discriminating means for discriminating presence or absence of a request for the drive of said auxiliary machinery; and
a controller for controlling an operating state of said internal combustion engine in response to at least one result from decisions on said operating state of the hybrid car by said first discriminating means, said charged state of said battery by said second discriminating means, and the presence or absence of said request for the drive of said auxiliary machinery by said third discriminating means, and said controller adjusting the internal combustion engine to an operating state such that the fuel consumption of the internal combustion engine is reduced when the auxiliary machinery drive is discriminated to be requested.

9. A hybrid car comprising:
an electric motor for driving the hybrid car;
a battery for supplying electric power to said electric motor;
a generator for charging said battery;
an internal combustion engine operatively isolated from said electric motor and used to drive said generator;
an auxiliary machinery driven by said internal combustion engine;
first discriminating means for discriminating an operating state of the hybrid car;
second discriminating means for discriminating a charged state of said battery;
third discriminating means for discriminating presence or absence of a request for the drive of said auxiliary machinery; and
a controller for controlling an operating state of said internal combustion engine in response to at least one result from decisions on said operating state of the hybrid car by said first discriminating means, said charged state of said battery by said second discriminating means, and the presence or absence of said request for the drive of said auxiliary machinery by said third discriminating means, said controller keeping said internal combustion engine in a stopped state when said operating state of said battery is discriminated as not needing to be charged, adjusting said internal combustion engine to a high-speed, high-load state when said operating state of said battery is discriminated as being insufficiently charged and driving said internal combustion engine in a low-speed, low-load state when said auxiliary machinery drive is discriminated as being requested.

10. A hybrid car according to claim 9, wherein said controller additionally brings said internal combustion engine to a stopped state, energizes and heats an electrically-heated heater for heating an exhaust gas purifying catalyst in an exhaust gas purifying device attached to said internal combustion engine, and starting said internal combustion engine by an engine starting device when a predetermined value is exceeded by the temperature of said exhaust gas purifying catalyst, said controller successively executing the additional steps when the drive of said internal combustion engine is discriminated as being requested and the temperature of said exhaust gas purifying catalyst is lower than said predetermined value.

11. A hybrid car according to claim 9, wherein the request for the auxiliary machinery drive is delivered each time conditions for the drive of said auxiliary machinery are satisfied in a case where said auxiliary machinery is driven intermittently.

12. A hybrid car according to claim 9, wherein the request for the auxiliary machinery drive is delivered continuously during a time period immediately after the satisfaction of conditions for the drive of the hybrid car and before the satisfaction of conditions for the stoppage of the hybrid car.

13. An operating method for a hybrid car which has an electric motor for driving the hybrid car, a battery for supplying electric power to the electric motor, a generator for charging the battery, an internal combustion engine operatively isolated from the electric motor and used to drive the generator, and an auxiliary machinery driven by means of the internal combustion engine, the method comprising steps of:
(a) discriminating an operating state of the hybrid car;
(b) discriminating a charged state of the battery;
(c) discriminating presence or absence of a request for the drive of the auxiliary machinery; and
(d) controlling an operating state of the internal combustion engine by means of a controller in response to at least one result from decisions on said operating state of the hybrid car discriminated at said step (a), said charged state of the battery discriminated at said step (b), and the presence or absence of the request for the auxiliary machinery drive discriminated at said step (c).

14. An operating method for a hybrid car which has an electric motor for driving the hybrid car, a battery for supplying electric power to the electric motor, a generator for charging the battery, an internal combustion engine operatively isolated from the electric motor and used to drive the generator, and an auxiliary machinery driven by means of the internal combustion engine, the method comprising the steps of:
(a) discriminating an operating state of the hybrid car;
(b) discriminating a charged state of the battery;
(c) discriminating presence or absence of a request for the drive of the auxiliary machinery; and
(d) controlling an operating state of the internal combustion engine by means of a controller in response to at least one result from decisions on said operating state of the hybrid car discriminated at said step (a), said charged state of the battery discriminated at said step (b), and the presence or absence of the request for the auxiliary machinery drive discriminated at said step (c), said step (d) including the steps of,
(d) (1) keeping the internal combustion engine in a stopped state when said operating state of the battery is discriminated as not needing to be charged,
(d) (2) adjusting the internal combustion engine to a high-speed, high-load state when said operating state of the battery is discriminated as being insufficiently charged, and
(d) (3) driving the internal combustion engine in a low-speed, low-load state when the auxiliary machinery drive is discriminated as being requested.

15. An operating method for a hybrid car according to claim 14, wherein additional steps are successively executed under the control of the controller when the drive of the internal combustion engine is discriminated as being requested and the temperature of an exhaust gas purifying catalyst in an exhaust gas purifying device attached to the internal combustion engine is lower than a predetermined value, the additional steps include,
bringing the internal combustion engine to a stopped state,
energizing and heating an electrically-heated heater for heating said exhaust gas purifying catalyst, and
starting the internal combustion engine by means of an engine starting device when the predetermined value is exceeded by the temperature of the exhaust gas purifying catalyst.

16. An operating method for a hybrid car according to claim 14, wherein the request for the auxiliary machinery drive is delivered each time conditions for the drive of the auxiliary machinery are satisfied in a case where the auxiliary machinery is driven intermittently.

17. An operating method for a hybrid car according to claim 14, wherein the request for the auxiliary machinery drive is delivered continuously during a time period immediately after the satisfaction of conditions for the drive of the hybrid car and before the satisfaction of conditions for the stoppage of the hybrid car.

* * * * *